Patented June 16, 1936

2,044,626

UNITED STATES PATENT OFFICE 2,044,626

METHOD OF CONCENTRATING LATEX

Johan Ernst Nyrop, Copenhagen, Denmark

No Drawing. Application November 10, 1934, Serial No. 752,531. In Denmark November 11, 1933

2 Claims. (Cl. 18—50)

It is known to concentrate latex by centrifuging or by evaporation in ordinary centrifugal separators or evaporators and that it is possible to produce whole latex rubber or latex paste by spraying latex to which protective colloids have been added. A latex with 35 per cent of rubber may by centrifuging produce a latex cream with a dry rubber content of 60 per cent. At the same time a skimmed latex is produced which likewise contains rubber. All the rubber of the latex is thus not in the cream. By evaporation all the rubber as well as the dry contents of the serum is retained in the concentrate. In some methods in which latex concentrates are used the constituents of the serum may have a detrimental effect.

The present invention relates to a method of concentrating latex in which evaporation and separation are combined in such a manner that a concentrate with a decreased content of serum constituents is formed without a considerable part of the rubber being conveyed to the skimmed latex.

The concentration according to this invention is effected by centrifuging a mixture of evaporated, and thus concentrated, skimmed latex and latex. A cream with a high percentage of rubber and a decreased percentage of the serum constituents is thereby produced. The skimmed latex produced at the same time as the cream is passed through an evaporator where it is concentrated into the latex serum which before the centrifuging is mixed with the latex. In a system comprising an evaporator and a separator a concentrated skimmed latex is thus circulating in which the contents of the dry material of this latex is increasing. At a suitable concentration part of the concentrated serum is removed and treated separately. By mixing concentrated serum and latex the separation is facilitated as the specific weight of the solution from which rubber is separated is increased.

In a modification of the invention concentrated skimmed latex is mixed with the cream and the mixture is separated by centrifugal means. The cream thus produced is utilized, whereas the skimmed latex mixed with fresh latex is returned to the first separator and thus to the system containing an evaporator and a separator.

To obtain reversible dissolvable concentrates of latex all the dispersions of rubber in serum or concentrated serum must be stable. The hydrogen ion concentration will thus have to be the proper. The stability may, however, be increased by the addition of anti-coagulating substances such as soap, ammoniacal solutions of fatty acids, casein, proteins, etc.

The addition of ammonia influences the hydrogen ion concentration in a favourable way and produces anti-coagulants with the proteins of the serum, resin, lipin, fatty acids, etc., and neutralizes the effect of quebrachitol.

The evaporation may take place in the ordinary evaporators in which a stirring or worm appliance at normal or decreased pressure, passes the latex between or over heated surfaces or through a heated cylinder or drum simultaneously with a current of hot air, the drum having appliances securing a renewing of the surfaces of the latex. The evaporation is carried out with the best result in rapid evaporators, for instance in which the latex is spread by the centrifugal force on the inner surface of a rapidly rotating cylinder through which hot air is passed, or the evaporation is effected by spraying latex into hot air. When the evaporation takes place in hot gas or gases it may be suitable to add ammonia to the gas or by other means secure that the hydrogen ion concentration is not altered during the evaporation. For this reason amines or similar compounds with a high boiling point may be added.

The concentrates mentioned may be evaporated according to the processes described, if required to dryness. Before such evaporations compounding ingredients, filling materials, anti-coagulating substances etc. may be added and the evaporation may be conducted either to complete dryness or to a concentrated paste-like latex capable of being again dispersed in water.

I claim:—

1. In a continuous latex concentrating process in which normal latex and concentrated skimmed latex are separated in a centrifuge to produce latex cream of high rubber content, and skimmed latex; the step of evaporating the skimmed latex continuously as it is discharged from said centrifuge to produce the aforesaid concentrated skimmed latex, continuously mixing this concentrated skimmed latex with the aforesaid normal latex, and continuously separating such mixture in said centrifuge.

2. In a continuous latex concentrating process in which normal latex cream and concentrated skimmed latex are separated in a centrifuge to produce latex cream of high rubber content, and skimmed latex; the step of evaporating the skimmed latex continuously as it is discharged from said centrifuge to produce the aforesaid concentrated skimmed latex, continuously mixing this concentrated skimmed latex with the aforesaid normal latex cream, and continuously separating such mixture in said centrifuge.

JOHAN ERNST NYROP.